United States Patent [19]
Hoffmann

[11] 4,265,079
[45] May 5, 1981

[54] RIGID GRASS CATCHER

[75] Inventor: Ralph L. Hoffmann, St. Louis, Mo.

[73] Assignee: The Perfection Manufacturing Company, St. Louis, Mo.

[21] Appl. No.: 9,164

[22] Filed: Feb. 5, 1979

[51] Int. Cl.³ ............................................. A01D 35/22
[52] U.S. Cl. ...................................... 56/202; 56/16.6
[58] Field of Search ................................. 56/202, 16.6

[56] References Cited

U.S. PATENT DOCUMENTS

| | | | |
|---|---|---|---|
| 2,955,402 | 10/1960 | Strasel | 56/202 |
| 2,983,095 | 5/1961 | Barth | 56/202 |
| 2,990,666 | 2/1961 | Blume | 56/202 |
| 3,113,690 | 12/1963 | Swenck | 220/315 |
| 3,186,152 | 6/1965 | Epstein | 56/202 |
| 3,386,234 | 6/1968 | Leader | 56/202 |
| 3,513,649 | 5/1970 | Berg | 56/202 |
| 3,757,503 | 9/1973 | Soldavini | 56/202 |

FOREIGN PATENT DOCUMENTS 556327  4/1958  Canada .............................. 85/DIG. 2

*Primary Examiner*—Paul J. Hirsch
*Attorney, Agent, or Firm*—Cohn, Powell & Hind

[57] ABSTRACT

A grass catcher having upper and lower hollow sections, each providing sidewalls of substantially equal depth and a transverse wall extending between said sidewalls. The upper section is connected to the lower section to provide a relatively deep container adapted to receive grass cuttings in a grass catcher mode. The upper and lower sections are nestable, one within the other, in a storage mode and can be disposed about the lawn mower motor assembly to facilitate shipping.

5 Claims, 8 Drawing Figures

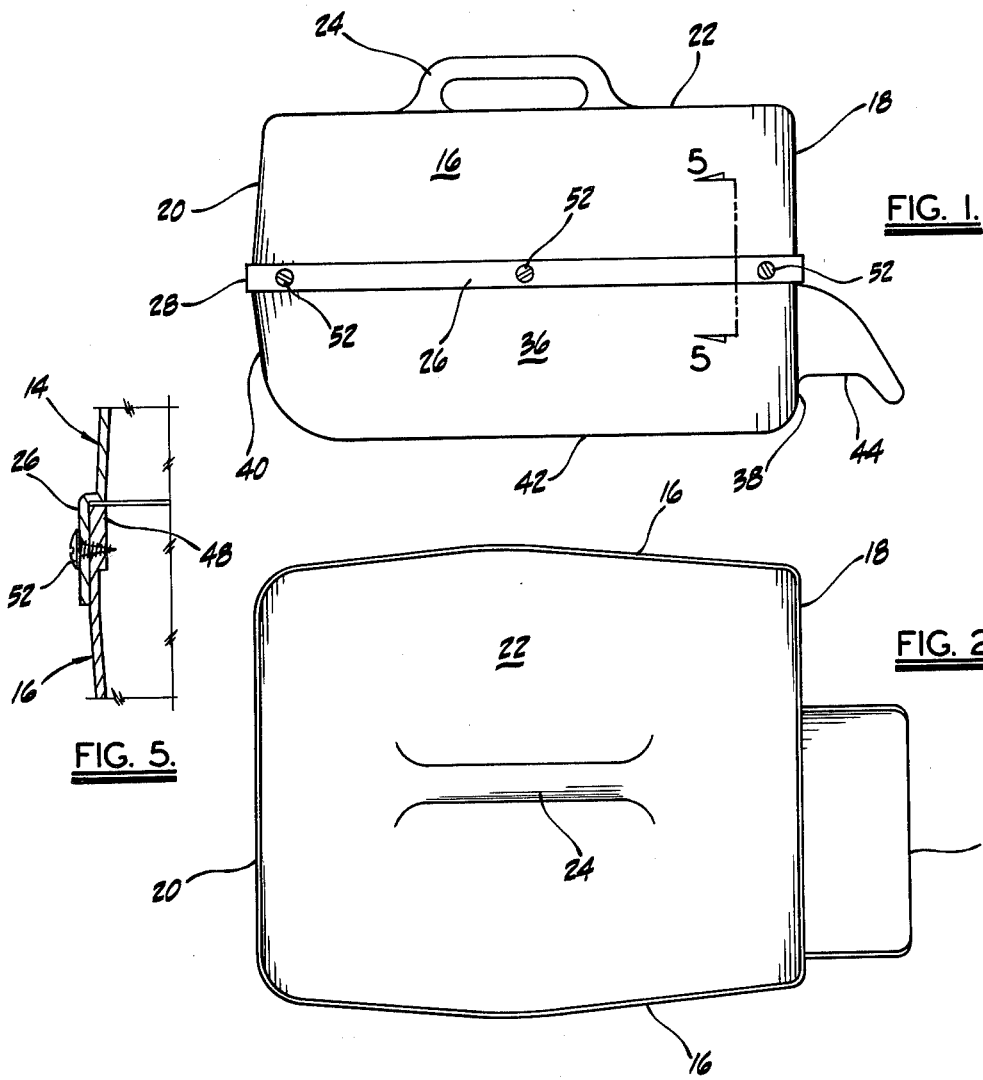
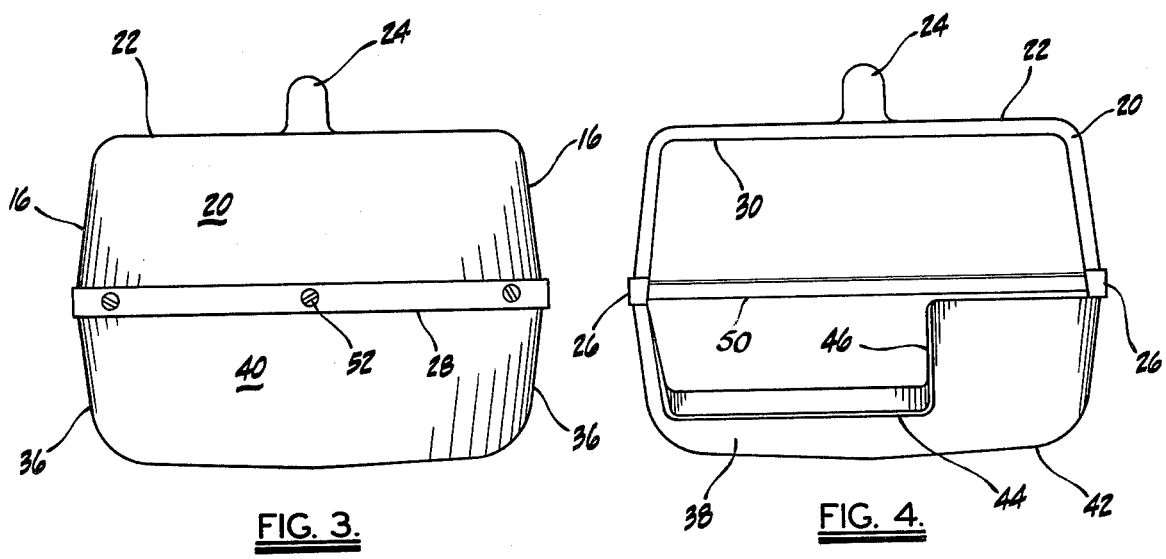

RIGID GRASS CATCHER

BACKGROUND OF THE INVENTION

This invention relates generally to improvements in a rigid grass catcher, and more particularly to a grass catcher which can be broken down into parts for storage.

Rigid grass catchers find favor with users because not only are they more sturdy than the flexible bag type of container but, in general, they are easier to install on the lawn mower for the reason that they are easier to handle.

However in spite of the advantages of the rigid type of catchers, previously known catchers suffer from the particular disadvantage that the rigidity which provides them with strength and convenience also renders them bulky. For this reason, they have proven to be relatively expensive to ship, requiring as they do a large container. In addition, it has been necessary, by and large, to ship them separately from the lawn mower itself.

SUMMARY OF THE INVENTION

The present lawn mower grass catcher provides a detachable rigid container which can be broken down into nestable parts for shipment.

The nestable parts are of substantially the same size to fit easily into a carton only slightly larger than one half of the size of the catcher as assembled.

Alternatively, the parts, when nested for storage, can be disposed over the lawn mower motor assembly and shipped with the mower in a carton not much larger than that required to ship the lawn mower alone.

This grass catcher includes a first hollow body section having opposed longitudinal sidewalls and a transverse wall extending therebetween; a second hollow body section having opposed longitudinal sidewalls and a transverse wall extending therebetween; means connecting the body sections together to form a container adapted to receive grass cuttings in a grass catching mode, and one of said sections being adapted to be nestable within the other of said sections in a storage mode.

The first and second sections are of substantially equal depth.

The first section is disposed uppermost in the grass catching mode and includes a carrying handle and the second section is nestable within the first section.

Each section includes longitudinally extending margin portions connected together in the grass catching mode.

The sidewalls of both containers are oppositely tapered in the grass catching mode for efficient nesting in the storage mode.

The nested sections are adapted to be received by the lawn mower for shipment with the lawn mower.

The first section includes a front end opening and the second section includes an outwardly projecting lip at the front end extending beyond the front end opening in the grass catcher mode of the first section and being received by the front end opening in the inverted, nestable storage mode.

BRIEF DESCRIPTION OF THE DRAWINGS:

FIG. 1 is a side elevational view of the grass catcher having upper and lower sections connected to form a container in the grass catching mode;

FIG. 2 is a top plan view of the grass catcher;

FIG. 3 is a rear elevational view of said catcher;

FIG. 4 is a front elevational view of said catcher;

FIG. 5 is an enlarged, fragmentary cross-sectional view of the connection between the upper and lower sections of the grass catcher;

DESCRIPTION OF THE PREFERRED EMBODIMENT

Figure 8:
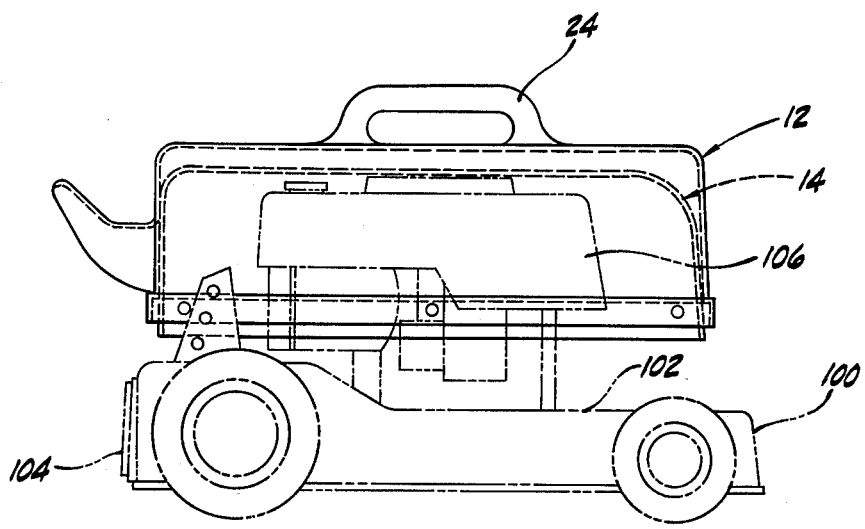
FIG. 8 is a side elevational view of the nested sections as carried on a lawn mower.

Referring now by reference numerals to the drawings and first to FIG. 1 it will be understood that the rigid grass catcher shown by 10 consists of upper and lower sections 12 and 14 respectively, which, in the preferred embodiment, are of substantially the same depth and which are connected to form a container structure for receiving grass from the discharge opening 104 provided in the housing 102 of a lawn mower 100 (FIG. 8).

The upper section, which constitutes a first hollow body section, includes opposed inclined longitudinal sidewalls 16, front and rear endwalls 18 and 20 respectively and an upper transverse wall 22 which is provided with a handle 24 to facilitate carrying the grass catcher 10. The upper section sidewalls 16 and rear end wall 20 include longitudinal and transverse margin portions 26 and 28 respectively, and the front end wall 20 defines an opening generally indicated by numeral 30 (FIG. 4).

The lower section 14, which constitutes a second hollow body section, includes opposed longitudinal sidewalls 36, front and rear end walls 38 and 40 respectively and a lower transverse wall 42. The lower section 14 also includes an outwardly projecting lip 44 which is integrally formed with the front end wall 38 and defines an opening 46 which is adapted to receive grass cuttings from the lawn mower discharge opening 104. The sidewalls 36 and rear endwall 40 include longitudinal and transverse margin portions 48 and 50 respectively connected to corresponding margin portions 26 and 28 said margins being suitably apertured to receive fasteners 52 in connected relation.

Figure 6:
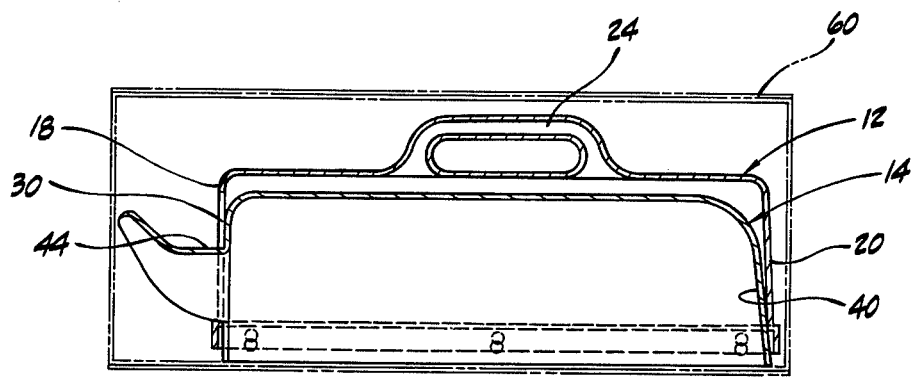
FIG. 6 is a longitudinal cross sectional view of the nested catcher sections in the storage mode as packed in a container for shipment.
Figure 7:
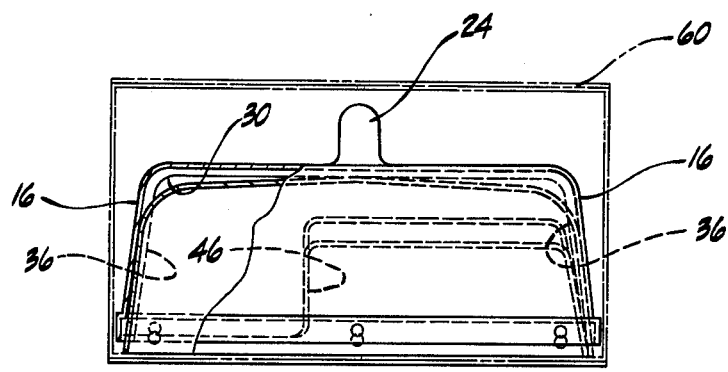
FIG. 7 is a rear elevational view of the nested sections partly in cross section.

The manner in which the sections are nested for storage is clearly shown in FIGS. 6-8. As shown in these views, the lower section 14 is inverted and is disposed within the upper section 12. The sidewalls and end walls of both sections 12 and 14 are tapered to facilitate the nesting of said sections so that the lower section transverse wall 42 is disposed in close proximity to the upper section transverse wall 22. In the nested, or storage mode, the scoop like portion 44, is received within the upper section opening 30. The outer walls of the lower section 14 are, except for the outwardly projecting lip 44 formed substantially without projections and, because the upper section handle 24 is disposed on the outer surface of the upper section transverse wall 22 the nesting is efficiently accomplished. Further facilitating the nesting effect the sidewalls 16 and 36 are of substantially the same height or depth so that only a small portion of the lower section 36 projects outwardly of the upper section 16 and the sections, in effect constitute half sections.

As shown particularly in FIGS. 6 and 7 the nesting of the upper and lower half sections 12 and 14 permits the rigid grass catcher to be broken down and shipped in a container indicated by numeral 60 which is of a relatively small size. Alternatively, as further shown in FIG. 8, the upper and lower nested half sections 12 and 14 can be disposed over the motor assembly 106 of the lawn mower assembly 100 or, depending on the size of the lawn mower with which the sections are to be used, the nested half sections can be carried by the lawn mower deck housing 102. As will be readily understood the combination of the nested sections and the lawn mower provides a storage feature which permits the lawn mower and rigid grass catcher to be shipped together as a unit.

I claim as my invention:

1. A rigid grass catcher for a lawn mower having a housing provided with a grass discharge opening, the catcher comprising:
   (a) a first hollow body section including opposed longitudinal sidewalls, a transverse wall extending between said sidewalls and a front end opening,
   (b) a second hollow body section having opposed longitudinal sidewalls, a transverse wall extending between said sidewalls, and outwardly projecting lip at the front end and a front end opening,
   (c) means connecting the body sections together to form a relatively deep grass catching container adapted to receive grass clippings in a grass catching mode, and
   (d) the second section being invertible and nestable within the first section, the lip of the second section being received by the opening of the first section, in a storage mode.

2. A rigid grass catcher as defined in claim 1, in which:
   (e) the first and second sections are substantially equal in depth and the front end opening of the first section is larger than the front end opening of the second section said second section opening being defined at least in part by said outwardly projecting lip.

3. A rigid grass catcher as defined in claim 1, in which:
   (e) the first section is disposed uppermost when the sections are in the grass catching mode and includes a molded carrying handle, and
   (f) the second section is nestable within said first section under the carrying handle in the storage mode.

4. A rigid grass catcher as defined in claim 1, in which:
   (e) the first section front end opening extends substantially between said longitudinal sidewalls, and
   (f) the second section outwardly projecting lip at the front end portion is offset to one side of the front end opening of the first section in the grass catcher mode and is offset to the other side of said first section end opening when received by said end opening in the nested storage mode.

5. In the lawn mower and rigid grass catcher assembly:
   (a) a lawn mower including:
      1. a housing having an upper deck portion, and
      2. a motor assembly projecting above said upper deck portion,
   (b) a rigid grass catcher including:
      1. a first hollow body section, having opposed sidewalls, a transverse wall extending between said sidewalls and a front end opening,
      2. a second hollow body section having opposed sidewalls, a transverse wall extending between said sidewalls and having substantially the same depth as the first body section and an outwardly projecting lip and a front end opening,
      3. said first and second hollow body sections being connectible to form a relatively deep container in a grass catching mode,
      4. said second section being receivable in nested relation within said first section, the lip of the second section being received by the opening of the first section, in a storage mode, and
      5. said first and second nested sections being received over the motor assembly for shipment, said motor assembly being substantially received by said nested sections.

* * * * *